May 29, 1956 — W. FINKELSTEIN — 2,747,706
HANDLE
Filed Nov. 12, 1954 — 2 Sheets-Sheet 1
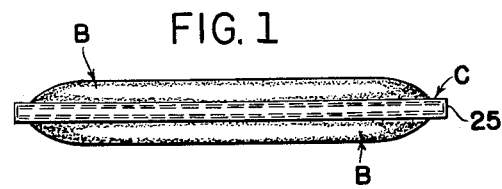
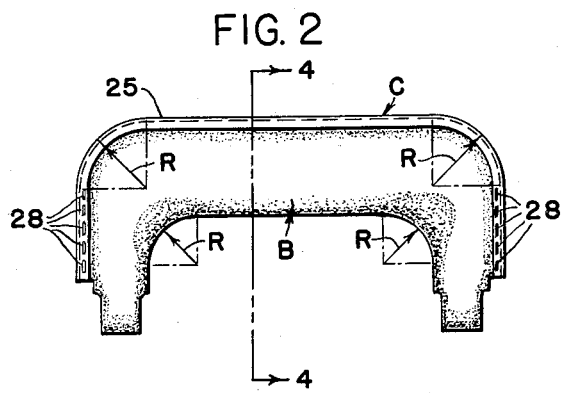
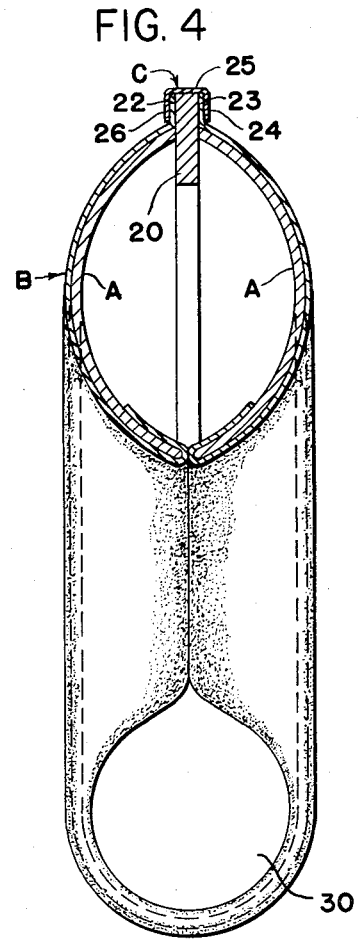
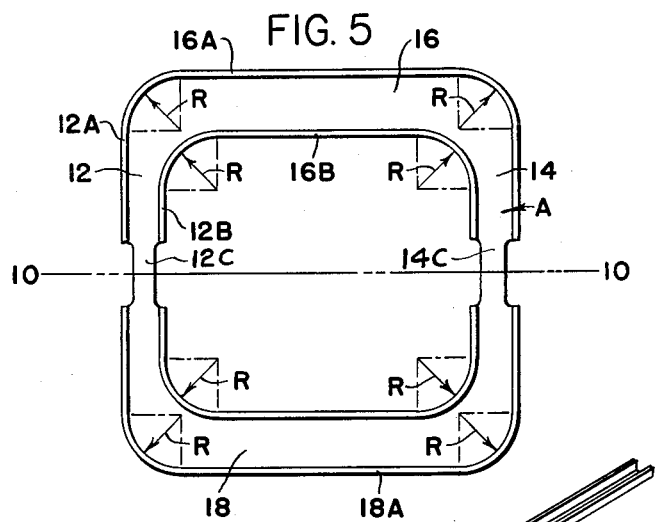
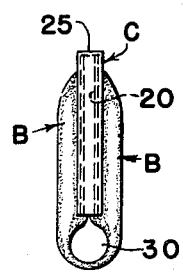
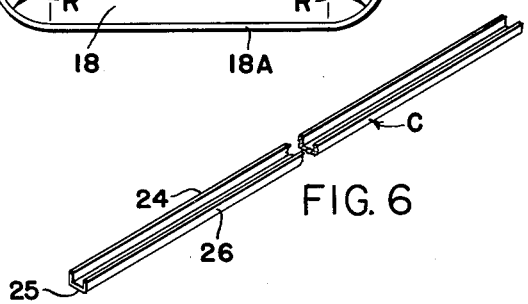
INVENTOR.
WILLIAM FINKELSTEIN
BY Harry Langsam
ATTORNEY May 29, 1956     W. FINKELSTEIN     2,747,706

HANDLE

Filed Nov. 12, 1954     2 Sheets-Sheet 2

*INVENTOR.*
WILLIAM FINKELSTEIN
BY Harry Langsam
ATTORNEY

United States Patent Office 2,747,706
Patented May 29, 1956

2,747,706
HANDLE

William Finkelstein, Philadelphia, Pa.

Application November 12, 1954, Serial No. 468,279

1 Claim. (Cl. 190—57)

My invention relates to a handle, and relates particularly to a handle which is held together without any stitching.

In my prior filed application, Serial No. 465,082, I show a handle wherein a pasteboard tongue is between the two metal halves of the handles, and wherein a series of stitches hold the pasteboard tongue and the covering together. In the prior filed application, the pasteboard tongue has a tendency to fray and open, and thereby presents an unattractive appearance to the handle after it is in use. Furthermore, the stitching has a tendency to cause the pasteboard tongue to fray since the stitches pierce the pasteboard tongue by weakening the pasteboard.

It is, therefore, an object of my invention to eliminate stitching in its entirety from a handle and to provide a channeled strip to hide the edge of the tongue of the handle.

It is an object of my invention to manufacture a handle having a core or metal stamping which is bent to form the shell of the handle, and wherein a channeled metal strip holds the upper edges of a cover for the stamping, as well as the tongue, thereby eliminating any open edges in the bent shell.

Another object of my invention is to provide a handle of a metal stamping which is attractive in appearance and is comfortable when held in the hand.

Other objects of my invention are to provide an improved device of the character described, that is easily and economically produced, which is sturdy in construction, and which is highly effective in operation.

With the above and related objects in view, my invention consists in the details of construction and combination of parts, as will be more fully understood from the following description, when read in conjunction with the accompanying drawings, in which:

Fig. 1 is a top view of a luggage handle embodying my invention.

Fig. 2 is a side view of the handle embodying my invention.

Fig. 3 is an end view of the handle.

Fig. 4 is a sectional view taken along the line 4—4 of Fig. 2.

Fig. 5 is a single metal stamping which forms the core of my handle.

Fig. 6 is a perspective view of the metal beading.

Figure 7:
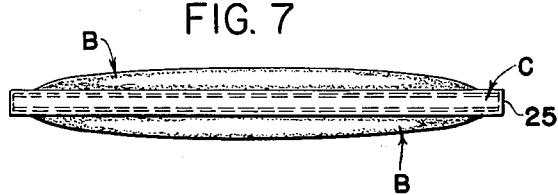
Fig. 7 is a top view of a round handle embodying my invention.

Referring now in greater detail to the drawings, wherein similar reference characters refer to similar parts, I disclose a square and round type of luggage handle embodying my invention, wherein the core or shell is made of a metal stamping or blank of the general type as disclosed in my co-pending patent application, Serial No. 361,452, filed June 15, 1953, now Patent No. 2,713,926, granted July 26, 1955, and generally designated as A.

In order to provide an attractive handle, and also to provide a handle which will be comfortable to grip, I stamp out of sheet metal a square-like or round member which is of continuous toroidal-like formation, and which is concave-convex in cross-section, so that when the stamping is folded along the line 10—10 it will have a substantial body thereto to form a hand grip portion.

The sides 12, 14 of the blank are parallel to one another, and are joined at their ends by horizontal parallel top and bottom members 16, 18 so that a continuous square-like member is formed. However, at the junction of the vertical side 12 and the horizontal top 16, an identical radius is formed, which is designated as R in both cases, to join the edges of the side and the top. The radius R, which joins the edges, produces and also creates the effect that the handle is square. The radius R joins a short vertical outer edge 12A of the side 12 and an outer edge 16A of the top together. Another radius R joins an inner edge 12B of the side to an inner edge 16B of the top 16.

Although the joining radii R are the same, they do not give that effect when viewed, as the outer corner radius appears to be different than the inner corner radius. The eight radii R are of identical lengths.

The width of the individual sides 12, 14 is narrower than the width of the top 16 and the bottom member 18 and the stamping is symmetrical about the line 10—10 so that when the stamping is folded, each section above and below the line 10—10 complements one another to provide a metal stamping handle shell.

A filler or pasteboard strip 20 is inserted between the two halves of the handle blank when folded about the line 10—10 after one side of the shell is covered with a leather-like covering, generally designated as B, which may or may not match the luggage to which it is attached, depending on the choice of covering selected. A metal U-shaped beading or channeled strip, generally designated as C, covers the upper edge or periphery of filler strip 20 and the upper edges 22, 23 of the covering B whereby two halves of the handle are held together and are joined by a bight 25.

The side edges 24, 26 of the channeled strip C are staked as at 28 in order to compress the edges of the lining and the pasteboard tongue, whereby the side edges are securely held to the covering and the tongue.

The U-shaped channel or strip or beading C of metal may hold itself, the upper edges of the covering and the tongue by virtue of the resiliency or flexibility of the parallel legs 24, 26. The legs may be diverging one from the other, and the connecting or bight portion may be flat or curved.

Although the staking may be dispensed with, I prefer to bend or squeeze the legs inwardly toward one another to provide a tight fit of the channeled strip to the top edges of the cover and the tongue.

The channel prevents the edges of the cover and the tongue from fraying and the channel of this invention protects the upper edges of the cover and also holds the two halves of the stamping together.

The concave-convex sides 12, 14 are narrower in width than the handle grip portions 16, 18 of the shell and the external edges 12A merge with the peripheral edges 16A by the radius R. The peripheral side edge 12B merges with the peripheral edge 16B by another radius R.

The side portions 12C, 14C of the blank adjacent the line 10—10 are narrower than the other portions of the sides 12, 14 to provide for the formation of an opening 30 at each end of the handle.

The grip portion 16, 18 of the handle is wide and thick, thereby being easy to grasp.

In assembly, a covering B is cemented over and to overhang one side of the metal blank or shell and then the blank is folded along the line 10—10 to provide openings 30 each for the reception of a loop or rod (not shown). Finally, the pasteboard tongue insert 20 is inserted between the upper edges 16A, 18A of the top and bottom portions of the stamping with portions 22 and 23 of the covering B covering the extended sides of the tongue 20 and then the U-shaped channel C is pressed over the cover portions 22, 23 and the channel C is staked in position or the legs are squeezed inwardly.

Figure 8:
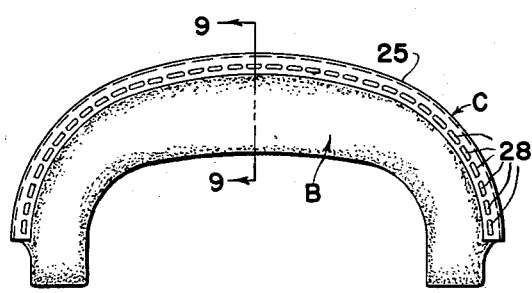
Fig. 8 is a side view of the rounded handle shown in Fig. 7.
Figure 9:
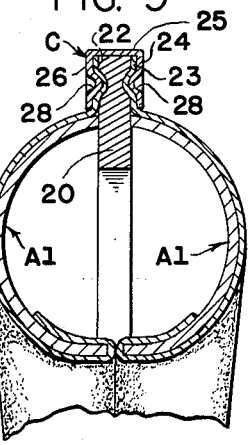
Fig. 9 is a sectional view taken along the line 9—9 of Fig. 8.
Figure 10:
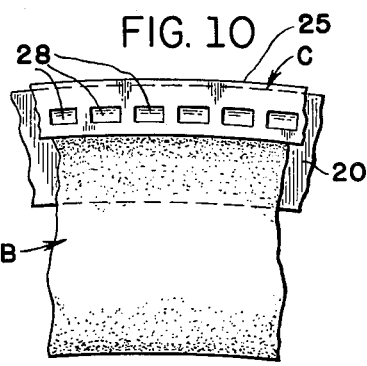
Fig. 10 is a fragmentary enlarged view of the channeled strip.
Figure 11:
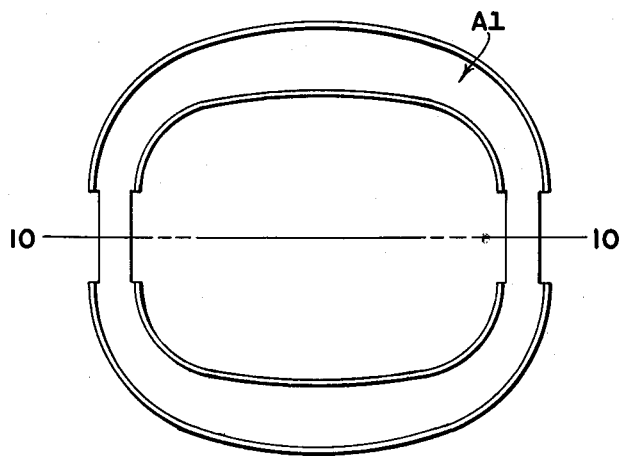
Fig. 11 is a plan view of a modified single metal stamping which forms the core of the handle.
Figure 12:
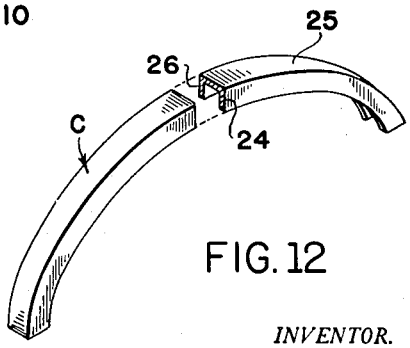
Fig. 12 is a perspective view of the channeled metal strip used on the rounded handle.

Figs. 7 to 12 disclose my invention as applied to a round type of handle having a metal stamping, generally designated as A1. The metal stamping A1 has a different configuration than the stamping A.

It is to be noted that the metal of the channeled strip C does not crumble or overlap due to the staking operation.

Although my invention has been described in considerable detail, such description is intended as being illustrative rather than limiting, since the invention may be variously embodied, and the scope of the invention is to be determined as claimed.

I claim as my invention:

A handle comprising an annular-like metal stamping which is concave-convex in cross section and forms a grip portion after being folded upon itself, said grip portion having upper and lower edges, said upper and lower edges extending inwardly, a tongue interposed between the upper edges of said folded stamping and extending above the uppermost surface of said grip portion, a covering cemented to the outside of said metal stamping, portions of said covering overlying the sides of said tongue which extend above the upper portion of said metal stamping, other portions of said covering lying between the lower adjoining edges of said folded metal stamping, and a channeled metal strip having parallel legs joined by a bight portion and overlapping the top of said tongue and the portions of said covering which engage the sides of said extending portion of said tongue above the metal stamping, and said metal strip secured to the uppermost edges of said covering by staking of the legs of said channeled strip against said covering whereby said covering and said tongue will be held together by said channeled strip.

References Cited in the file of this patent

UNITED STATES PATENTS

| | | |
|---|---|---|
| 2,379,179 | Peterson | June 26, 1945 |
| 2,519,604 | Romolt | Aug. 22, 1950 |
| 2,563,134 | Romolt | Aug. 7, 1951 |

FOREIGN PATENTS

| | | |
|---|---|---|
| 326,646 | Great Britain | Mar. 20, 1930 |